May 15, 1945.  G. W. WOLCOTT  2,376,022
PLURAL WAY COCK
Filed Sept. 24, 1943  2 Sheets-Sheet 1

Inventor
G. W. Wolcott,
C. B. Stevens
Attorney

May 15, 1945. G. W. WOLCOTT 2,376,022
PLURAL WAY COCK
Filed Sept. 24, 1943 2 Sheets-Sheet 2
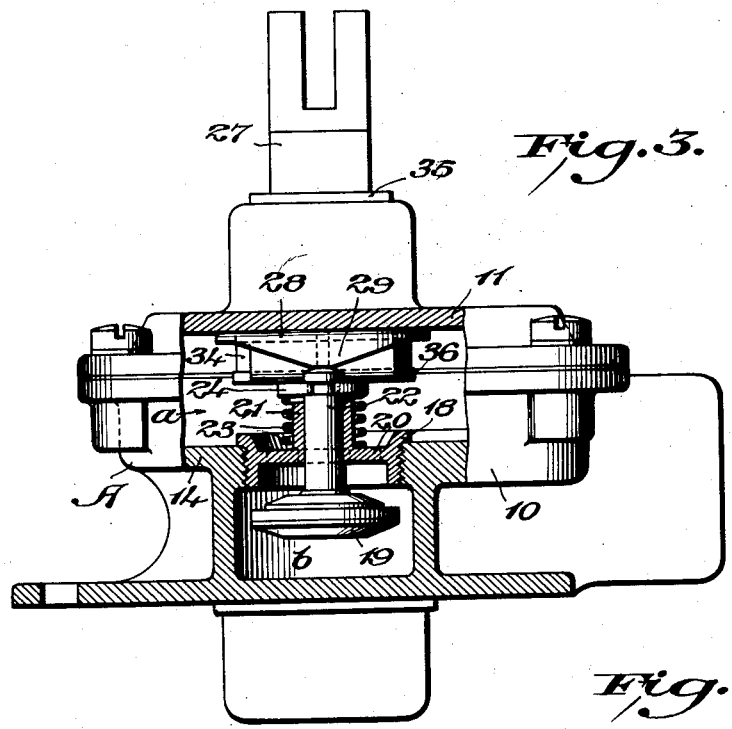
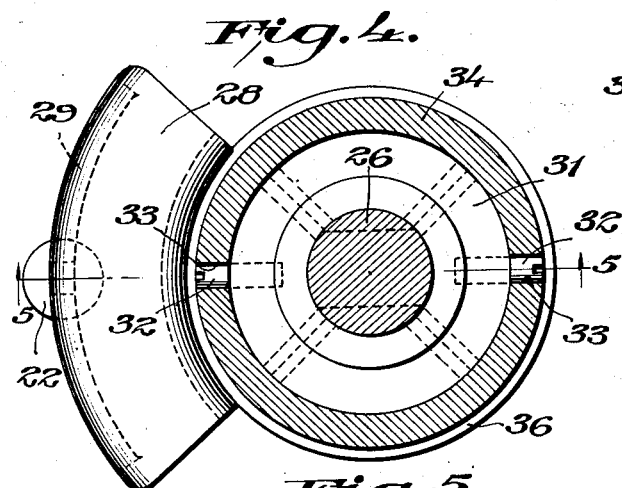
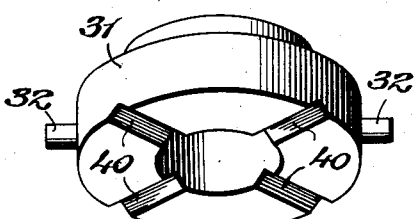
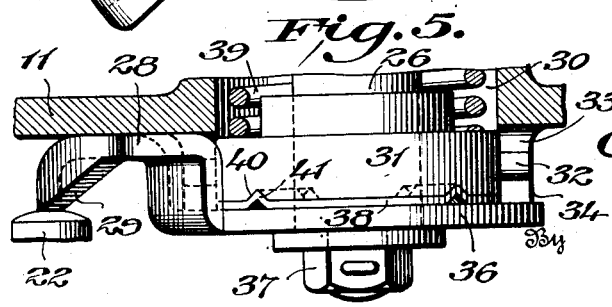
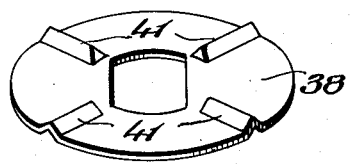
Inventor
G. W. Wolcott,
C. B. Stevens
Attorney Patented May 15, 1945

2,376,022

UNITED STATES PATENT OFFICE 2,376,022

PLURAL-WAY COCK

Glenn W. Wolcott, Dayton, Ohio, assignor to United Aircraft Products, Inc., Dayton, Ohio, a corporation of Ohio Application September 24, 1943, Serial No. 503,686

3 Claims. (Cl. 277—20)

This invention relates to plural-way cocks, and has particular reference to improvements in plural-way cocks of the general type comprising a casing, partition means in said casing dividing the same into a main chamber and a plurality of auxiliary chambers separate from each other and from said main chamber, an inlet or outlet opening individual to each of said chambers, ports in said partition means individual to said auxiliary chambers affording communication between the latter and said main chamber, normally closed valves individual to said ports, and an arm mounted for swinging movement into engagement with any one of said valves to open the same and thereby establish communication between the inlet or outlet opening, related to said main chamber and the inlet or outlet opening related to any one of said auxiliary chambers.

One special object of the invention is to provide a cock of the general type mentioned which is of simple, compact construction, easy to produce, of low production cost and thoroughly reliable in use.

According to the invention the valves are of the reciprocal poppet type angularly spaced apart about a prolongation of the axis of a shaft by which the valve actuating arm is carried, the valve actuating arm is swingable in a plane at right angles to the axis of said valves, and said arm is provided at its free end with a cam formation for engagement with the free end of the stem of any one of said valves to open the latter in response to swinging movement of said arm. In this connection another special and important object of the invention is to provide for wiping engagement of the free end portion of the arm with a wall portion of the casing which is alined with and opposite the valves so that the said free end portion of said arm reacts from said wall portion and thereby is relieved of bending forces in imposing its valve-opening force upon any one of said valves.

Another special and important object of the invention is to provide a simple indexing means to yieldably hold the shaft and arm against rotation when the arm is in a position holding any one of the valves open; to provide a sealing ring on the shaft for cooperation with the latter and with the casing to seal the opening in the casing through which the shaft extends against any escape therethrough of fluid from the casing, and to provide a single spring to maintain said sealing ring in sealing engagement with said shaft and the casing and to afford the yieldable element of said indexing means.

With the foregoing and other objects in view which will become more fully apparent as the nature of the invention is better understood, the same consists of a plural-way cock embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Fig. 3 is a section on the line 3—3 of Fig. 1.

Fig. 4 is a section on the line 4—4 of Fig. 1.

Fig. 5 is a section on the line 5—5 of Fig. 4.

Fig. 6 is a perspective view of the indexing collar element; and

Fig. 7 is a perspective view of the indexing disk element.

Figure 1:
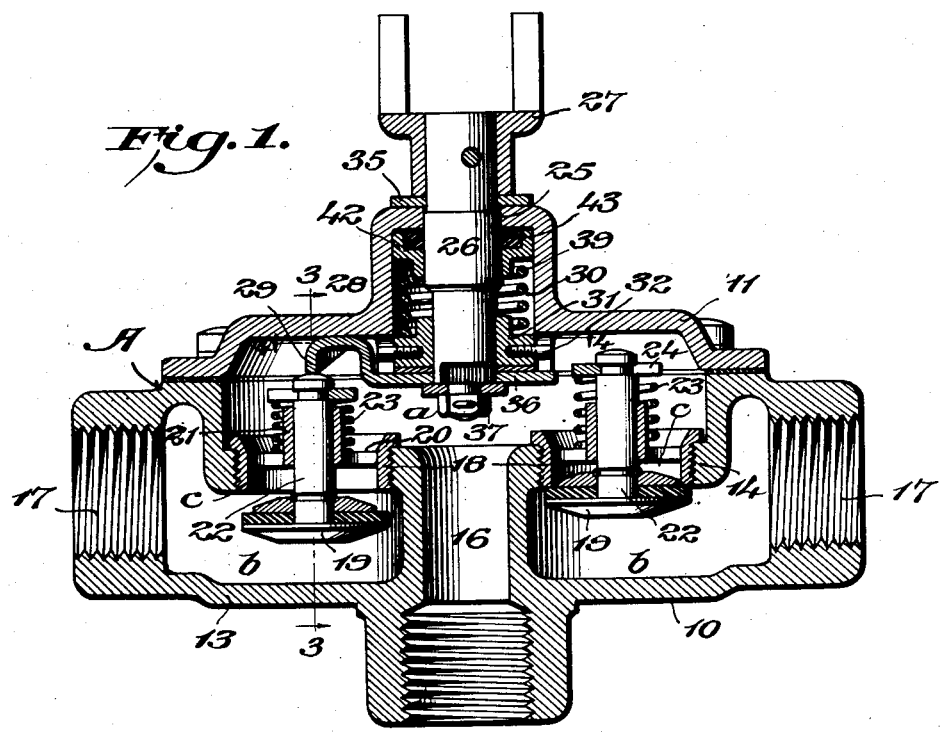
Fig. 1 is a central, longitudinal section through a plural-way valve constructed in accordance with one practical embodiment of the invention.
Figure 2:
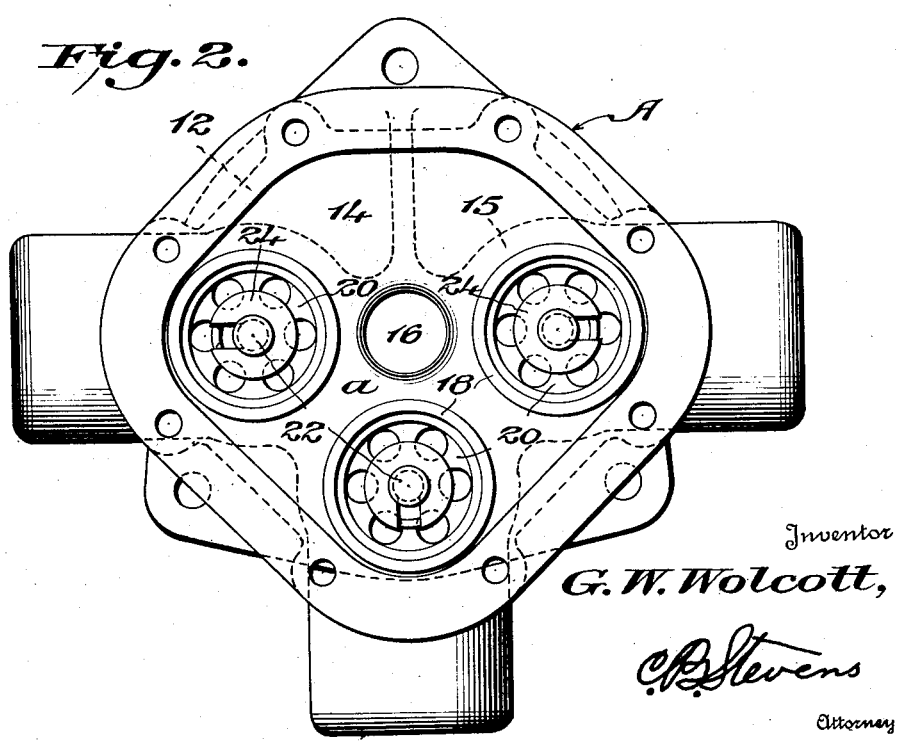
Fig. 2 is an end elevation of the valve with the cover assembly thereof removed.

Referring to the drawings in detail, A designates the casing of the present valve which may be of any suitable shape in end elevation and which preferably is composed, as shown, of a body 10 and a removable cover 11.

The body 10 is closed at its sides, as indicated at 12, and at one end, as indicated at 13, and is open at its other end where it normally is closed by the cover 11. In said body is partition means comprising a transverse partition element 14 intermediate the ends of said body and longitudinal partition elements 15 extending between said partition element 14 and the closed end 13 of said body, dividing the latter into a main chamber $a$ located between the partition element 14 and the cover 10 and a plurality of auxiliary chambers $b$ separate from each other and from said main chamber $a$ and located between said partition 14 and the closed end 13 of the casing.

Also in the body 10, or even in the cover 11 if desired is an outlet opening 16 which is in constant communication with the chamber $a$ and which is adapted to have connected therein a pipe for conducting fluid from said chamber $a$, while in the side wall 12 of said casing body, or even in the end wall 13 thereof if desired, is a plurality of inlet openings 17, one individual to each of the chambers $b$ and in constant communication therewith, which are adapted to have connected therewith pipes for conducting fluid to said chambers $b$.

In the transverse partition element 14 are openings in which are threaded tubular valve seat members 18 defining ports c, one individual to each of the auxiliary chambers b, affording communication between said auxiliary chambers and the main chamber a, while associated with each of said valve seat members is a reciprocal valve 19, preferably of the poppet type, for controlling flow of fluid from the related auxiliary chamber b, through the related port c into the main chamber a.

Each valve seat member 18 includes a web 20 supporting a central tubular guide portion 21 in which is slidably mounted the stem 22 of the related valve 19 whereby the valves are mounted for opening and closing movements, and in accordance with the illustrated embodiment of the invention said valves are arranged to open by movement thereof toward the chambers b, to close by movement thereof toward the chamber c and are constantly urged toward closed positions by coil springs 23 interposed between the webs 20 and suitable abutments 24 on the stems 22.

Extending into the chamber a through an opening 25 in the cover 11 is a shaft 26 which is disposed longitudinally relative to the casing A and which is provided at its outer end with suitable means 27 for effecting its rotation.

The valves 19 also are disposed longitudinally relative to the casing A with their axes parallel to each other and to the sahft 26, and they are spaced equal, or substantially, distances radially from a prolongation of the axis of said shaft; also they are spaced, preferably, but not necessarily equal distances apart angularly relative to said shaft. Moreover, the free end portions of their stems 22 are disposed in the main chamber a in the path of swinging movement of the free end portion of an arm 28 which, at its other end, is suitably mounted upon the shaft 26 for rotation therewith.

The said free end portion of the arm 28 is provided with an inwardly directed, V-shaped cam formation 29 to engage with the free end of any one of the valve stems 22 to depress the latter and open the related valve 19 in response to swinging movement of said arm. Accordingly, by rotating the shaft 26 to engage the peak of the cam formation 29 with the free end of any one of the valve stems 22 and to thereby open the related valve 19, communication may be established between any one of the auxiliary chambers b and the main chamber a or, in other words, between any one of the openings 17 and the opening 16. In this connection it will be observed that the free end portion of the arm 28 has wiping engagement with that portion of the inner face of the cover 11 which is opposite and alined with the valve stems 22 whereby it is held effectively against outward movement. Manifestly, therefore, the said free end portion of said arm reacts from said cover in imposing, through the cam formation 29, its opening force upon any one of the valve stems 22 and, consequently, said arm is relieved of any bending force and the shaft 26 is relieved of any lateral thrust incident to valve opening actuation of said arm. Thus, full and positive opening of any given valve in response to rotation of the shaft 26 is assured and, at the same time, undesirable stresses and thrusts in the valve opening mechanism are avoided with the result that the latter is at all times freely movable to accomplish its function.

The invention preferably includes indexing means to aid in determining when the arm 28 is in valve-opening position with respect to any one of the valves 19 and to releasably hold said arm in that position. In this connection it will be observed that the cover 11 is provided with a recess 30 in surrounding relationship to the shaft 26 and that in said recess is neatly fitted a collar 31 through which said shaft extends, said collar thereby acting as a journal bearing for the inner end portion of said shaft. The shaft 26 is freely rotatably in said collar 31 and the latter is freely movable longitudinally in the recess 30 and also with respect to said shaft, but is suitably held against rotation as, for example, by means of one or more pins 32 extending laterally therefrom into one or more slots 33 in an annular flange 34 projecting inwardly from the cover 11 and defining the inner end portion of the recess 30.

The shaft 26 is suitably held against inward movement as, for example, through the instrumentality of its rotating means 27 engaging a washer 35 which is disposed against the outer face of the cover 11, and is suitably held against outward movement, as, for example, by means of the disk-like inner end portion 36 of the arm 28 being suitably fastened to the inner end thereof as, for example, by means of a nut 37, and being disposed in abutting engagement with the inner end of the angular flange 34. In any event, a disk 38 is mounted on the inner end portion of the shaft 26 for rotation therewith and is suitably held against inward movement relative to said shaft as, for example, by being seated upon the inner end portion 36 of the arm 28, and the collar 31 is constantly urged inwardly against said disk by a suitable spring 39.

In the inner end of the collar 31 is a plurality of grooves 40 having the same angular relationship to each other as said valves, while extending outwardly from the disk 38 is at least one projection 41 to engage in any one of said grooves 40. Thus, in any valve-opening position of rotation of the shaft 26, and the arm 28, the projection 41 is engaged in the related groove 40 and said shaft and arm thereby are held against accidental rotation from that position. However, upon applying a positive rotating force to said shaft, the disk 38 is rotated therewith, the projection 41 is caused to ride out of the groove 40 with which it is engaged and the collar 31 thereby is moved outwardly against the force of the spring 39 to snap inwardly when the projection 41 becomes alined with another of the grooves 40 thereby to yieldably and releasably hold the shaft and arm against rotation in its new valve-opening position.

Preferably, but not necessarily, the valves 19 are equally spaced apart angularly and the disk 38 is provided with a plurality of projections 41 corresponding in number to the number of grooves 40 in the collar 31. In any event, the illustrated and described arrangement of said grooves and said projection or projections may obviously be reversed if desired by providing the recesses in the disk 38 and the projection or projections on the collar 31.

In the outer end portion of the recess 30 is a cup-like member 42 through which the shaft 26 extends and which is slidable longitudinally relative to said shaft. Fitted in this cup-like member in surrounding relation to the shaft 26 and interposed between said member and the inner face of the wall of the cover 11 through which said shaft extends, is a packing ring 43 which, by force exerted outwardly upon said cup-like member, is urged against the said face of said wall and against said shaft to seal the opening 25 against escape therethrough of fluid from the chamber $a$. In this connection it will be observed that the spring 39 is interposed between the cup-like member 42 and the collar 31 and thereby reacts from the former to urge the latter inwardly and from the latter to urge the former outwardly, thereby performing the dual function of applying the required force to the cup-like member 42 and the packing ring 43 to seal the opening 25 and applying the required yielding force to the collar 31 of the indexing mechanism.

While the openings 16 and 17 have been described as outlet and inlet openings, respectively, it is manifest that these openings may be inlet and outlet openings, respectively, depending upon the particular use to which the cock is to be put.

From the foregoing description considered in connection with the accompanying drawings, it is believed that the features and advantages of the invention will be clearly understood and appreciated. It is desired to point out, however, that while only a single, specific embodiment of the invention has been illustrated and described, the same is readily capable of embodiment in various specifically different mechanical structures within its spirit and scope as defined in the appended claims.

What I claim is:

1. A plural way cock, comprising a housing formed with a longitudinal partition separating said housing into first and second chambers, said partition constituting a closure for said first chamber, a removable plate secured to said housing and constituting a closure for said second chamber, an internal boss in said housing passing through said first chamber and said partition, said boss defining a fluid passage connecting said second chamber to the exterior of the housing, means dividing said first chamber into a plurality of compartments radially spaced about said boss, fluid ports communicating respective compartments with the exterior of the housing, ports in said partition communicating respective compartments with said second chamber and thereby with the passage through said boss, valves controlling said partition ports and having stems extending into said second chamber, a shaft rotatably mounted in said removable closure plate and having an inner end terminating within said second chamber in line with said boss, and a valve operating arm on the inner end of said shaft rotatable with said shaft to effect selective operation of said valves and thereby selectively communicate the compartments of said first chamber with said second chamber, said arm including a disk portion surrounding said shaft and abutting said closure plate.

2. A plural way cock, according to claim 1, characterized in that said valve operating arm further includes a segmental flange portion in cooperative relation with the stems of said valves and abutting said closure plate at a point radially outward of the area abutted by said disk portion.

3. A plural way cock, comprising a housing formed with a longitudinal partition separating said housing into first and second chambers, said partition forming a closure for said first chamber, a removable plate on said housing forming a closure for said second chamber, an internal boss in said housing passing through said first chamber and said partition, said boss defining a fluid passage connecting said second chamber to the exterior of the housing, means dividing said first chamber into a plurality of compartments radially spaced about said boss, fluid ports in said partition communicating said compartments with said second chamber and thereby with the passage through said boss, valves controlling said ports and having stems extending into said second chamber, a shaft rotatably mounted in said removable closure plate and having an inner end terminating within said second chamber in line with said boss, an internal boss on said closure plate surrounding said shaft and facing the internal boss in said housing, and a valve operating arm on the inner end of said shaft rotatable with said shaft to effect selective operation of said valves, said arm including a disk portion surrounding said shaft and abutting the internal boss on said closure plate, and said arm further including a segmental flange portion in cooperative relation with the stems of said valves and abutting said closure plate outside the internal boss thereon.

GLENN W. WOLCOTT.